(12) United States Patent
Matsumoto et al.

(10) Patent No.: US 8,936,885 B2
(45) Date of Patent: Jan. 20, 2015

(54) FUEL CELL SYSTEM

(75) Inventors: Mitsunori Matsumoto, Utsunomiya (JP); Takatsugu Koyama, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 213 days.

(21) Appl. No.: 13/479,323

(22) Filed: May 24, 2012

(65) Prior Publication Data
US 2012/0301798 A1 Nov. 29, 2012

(30) Foreign Application Priority Data

May 26, 2011 (JP) ................................ 2011-118230
Apr. 13, 2012 (JP) ................................ 2012-091520

(51) Int. Cl.
*H01M 8/04* (2006.01)
*H01M 8/06* (2006.01)

(52) U.S. Cl.
CPC ............ *H01M 8/04097* (2013.01); *Y02E 60/50* (2013.01)
USPC ............................ 429/414; 429/415; 429/444

(58) Field of Classification Search
None
See application file for complete search history.

(56) References Cited

U.S. PATENT DOCUMENTS

2004/0234829 A1* 11/2004 Sederquist et al. ............. 429/26
2005/0260466 A1* 11/2005 Kobayashi et al. ............. 429/13

FOREIGN PATENT DOCUMENTS

| JP | 08-031436 A | 2/1996 |
| JP | 2003-132916 A | 5/2003 |
| JP | 2006-032205 A | 2/2006 |
| JP | 2011-009057 A | 1/2011 |

* cited by examiner

*Primary Examiner* — Jonathan Crepeau
(74) *Attorney, Agent, or Firm* — Squire Patton Boggs (US) LLP

(57) ABSTRACT

A fuel cell system includes a fuel cell formed by stacking a plurality of power generation cells, and an oxygen-containing gas supply apparatus for supplying an oxygen-containing gas to the fuel cell. The oxygen-containing gas supply apparatus includes an oxygen-containing gas supply channel connected to an oxygen-containing gas inlet of the fuel cell for allowing the oxygen-containing gas to flow from an air pump into the oxygen-containing gas inlet, a branch supply channel branched from the oxygen-containing gas supply channel and which is opened to the inside of a fuel cell chamber, an oxygen-containing gas discharge channel for discharging an oxygen-containing off gas from the fuel cell, and an oxygen-containing off gas circulation channel one end of which is connected to the oxygen-containing gas discharge channel, and another end of which is connected to the oxygen-containing gas supply channel at a position upstream from the air pump.

6 Claims, 6 Drawing Sheets

FIG. 6 PRIOR ART

FUEL CELL SYSTEM

CROSS-REFERENCE TO RELATED APPLICATION

This application is based upon and claims the benefit of priority from Japanese Patent Applications No. 2011-118230 filed on May 26, 2011 and No. 2012-091520 filed on Apr. 13, 2012, of which the contents are incorporated herein by reference.

BACKGROUND OF THE INVENTION

1. Field of the Invention

The present invention relates to a fuel cell system including a fuel cell having a power generation cell. The power generation cell has a membrane electrode assembly. The membrane electrode assembly includes a cathode, an anode, and an electrolyte membrane interposed between the cathode and the anode. The fuel cell performs power generation as a result of electrochemical reactions occurring between an oxygen-containing gas supplied to the cathode and a fuel gas supplied to the anode. The fuel cell system further includes an oxygen-containing gas supply apparatus for supplying the oxygen-containing gas to the fuel cell.

2. Description of the Related Art

For example, a solid polymer electrolyte fuel cell employs an electrolyte membrane comprising a polymer ion exchange membrane. The electrolyte membrane is interposed between an anode and a cathode to thereby form a membrane electrode assembly (MEA). The membrane electrode assembly is sandwiched between a pair of separators.

A fuel gas flow field is formed between one of the separators and the membrane electrode assembly for supplying a fuel gas to the anode, and an oxygen-containing gas flow field is formed between the other of the separators and the membrane electrode assembly for supplying an oxygen-containing gas to the cathode. Further, a coolant flow field is formed between adjacent separators of each of the fuel cells for allowing a coolant to flow within areas alongside each of the electrodes.

In particular, in the case that the fuel cell is mounted in a fuel cell based electric vehicle, the fuel cell may possibly be placed in a fuel cell box. In such a fuel cell box, a fuel cell chamber for containing the fuel cell is formed, and a ventilation device is used for ventilating the fuel cell chamber. When entry of hydrogen into the fuel cell box from a hydrogen line of the fuel cell is detected, the ventilation device discharges the hydrogen to the outside of the fuel cell box by means of a ventilating fan.

Further, in a vehicle-mounted fuel cell, a limited space, such as the space underneath the vehicle floor or a front box, may be used as a fuel cell chamber that contains the fuel cell therein. For this purpose, the space in which the fuel cell is installed, i.e., the fuel cell chamber, needs to be ventilated in the same manner as in the case of a fuel cell box.

Figure 6:
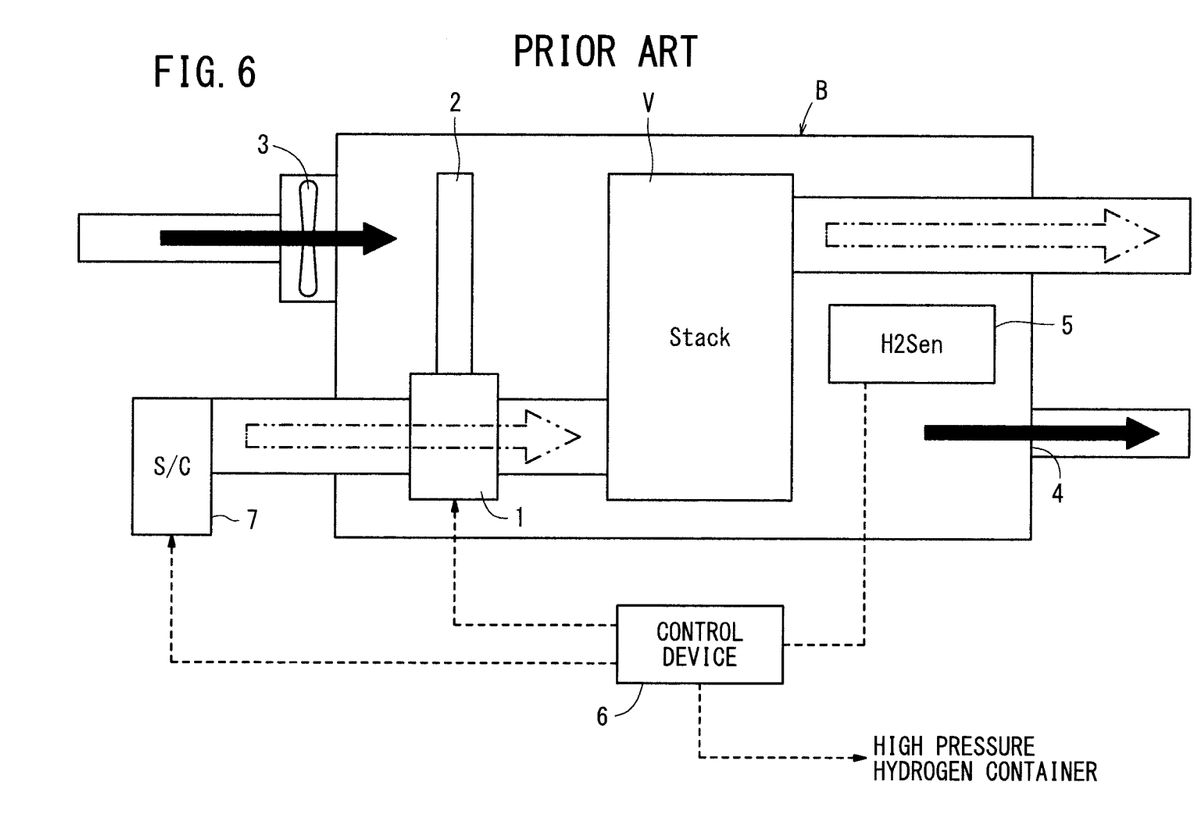
FIG. 6 is a diagram schematically showing a fuel cell box ventilation device according to Conventional Technique 1.

In this regard, for example, a fuel cell box ventilation device is known as disclosed in Japanese Laid-Open Patent Publication No. 2003-132916 (hereinafter referred to as "Conventional Example 1"). As shown in FIG. 6, the fuel cell box ventilator includes a three-way valve 1, a ventilating pipe 2, a ventilating fan 3, a discharge port 4, a hydrogen detection sensor 5, and a control device 6.

When hydrogen in a fuel cell box B is detected by the hydrogen detection sensor 5, the three-way valve 1 is operated in correspondence with the detection value. Therefore, air supplied from an air pump 7 to the fuel cell V is released into the fuel cell box B through the ventilating pipe 2.

SUMMARY OF THE INVENTION

In Conventional Example 1, outside air, which is sucked in by the air pump 7, flows through the ventilating pipe 2 by a switching operation of the three-way valve 1, whereby air is released into the fuel cell box B. Therefore, air having low humidity may flow into the fuel cell box B, and static electricity, i.e., static charge, tends to accumulate inside the fuel cell box B.

The present invention has been made to solve problems of this type. An object of the present invention is to provide a fuel cell system having a simple structure, which makes it possible to ventilate a fuel cell chamber and to suppress generation of static electricity in the fuel cell chamber as much as possible.

The present invention relates to a fuel cell system including a fuel cell having a power generation cell. The power generation cell comprises a membrane electrode assembly. The membrane electrode assembly includes a cathode, an anode, and an electrolyte membrane interposed between the cathode and the anode. The fuel cell performs power generation by causing electrochemical reactions between an oxygen-containing gas supplied to the cathode and a fuel gas supplied to the anode. The fuel cell system further includes an oxygen-containing gas supply apparatus for supplying the oxygen-containing gas to the fuel cell.

In the fuel cell system, the oxygen-containing gas supply apparatus comprises an oxygen-containing gas supply channel, a branch supply channel, an oxygen-containing gas discharge channel, and an oxygen-containing off gas circulation channel. The oxygen-containing gas supply channel is connected to an oxygen-containing gas inlet of the fuel cell for allowing the oxygen-containing gas supplied from a fluid pressure device to flow into the oxygen-containing gas inlet. The branch supply channel is branched from the oxygen-containing gas supply channel. The branch supply channel is opened to the inside of a fuel cell chamber containing the fuel cell. The oxygen-containing gas discharge channel discharges the oxygen-containing gas from the fuel cell as an oxygen-containing off gas. The oxygen-containing off gas circulation channel has one end, which is connected to the oxygen-containing gas discharge channel, and another end, which is connected to the oxygen-containing gas supply channel at a position upstream from the branch supply channel. The oxygen-containing off gas circulation channel is configured to return the oxygen-containing gas discharged from the oxygen-containing gas discharge channel to the oxygen-containing gas supply channel at a position upstream from the branch supply channel.

In the present invention, highly humid oxygen-containing off gas flows through the oxygen-containing off gas circulation channel and is returned to the oxygen-containing gas supply channel at a position upstream from the branch supply channel. In this structure, highly humid oxygen-containing off gas is reliably supplied into the fuel cell chamber through the branch supply channel.

Thus, the fuel cell chamber can be ventilated with a simple structure, whereby generation of static electricity in the fuel cell chamber can be suppressed as much as possible.

The above and other objects, features and advantages of the present invention will become more apparent from the following description when taken in conjunction with the

DESCRIPTION OF THE PREFERRED EMBODIMENTS

Figure 1:
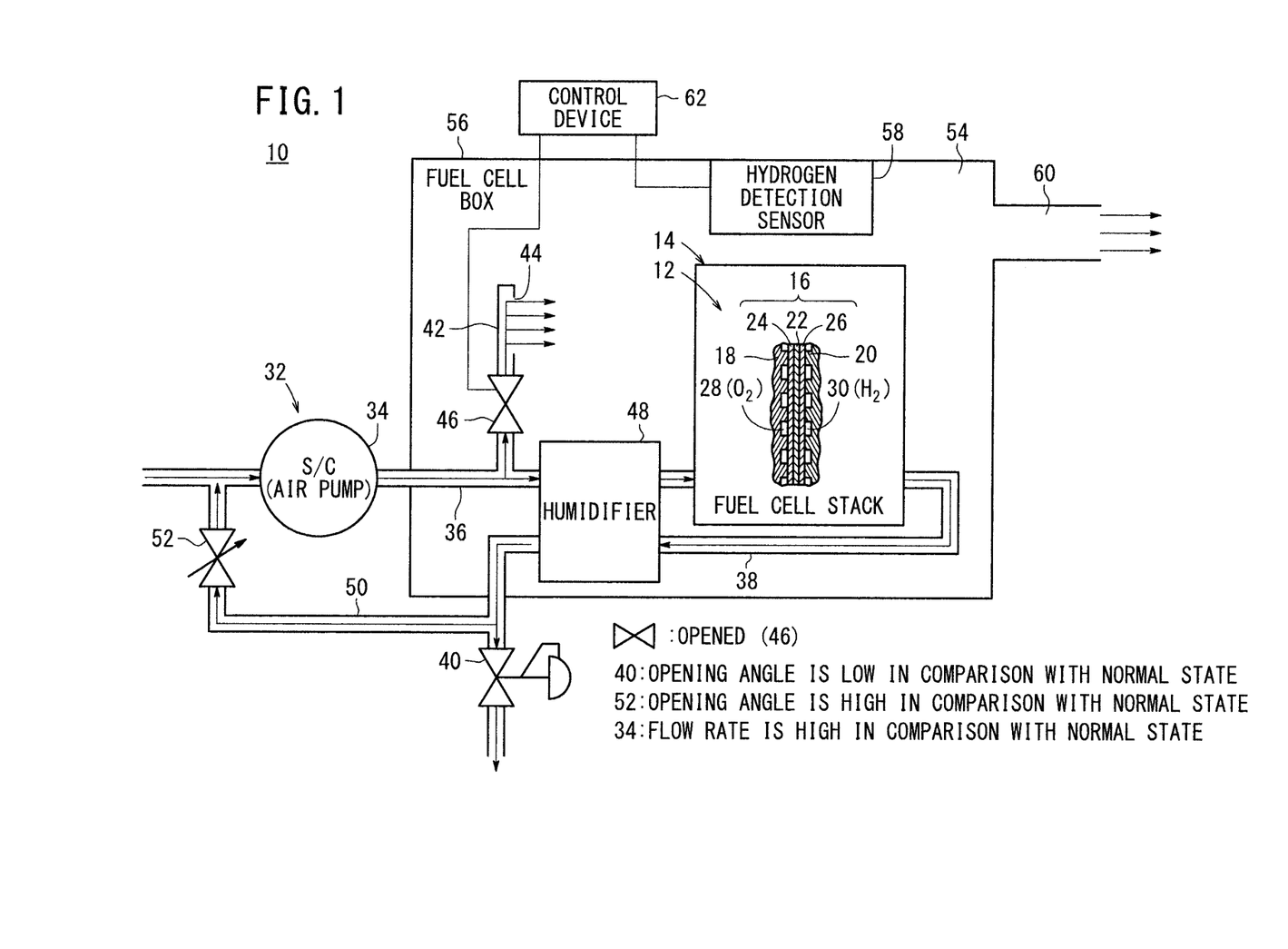
FIG. 1 is a diagram schematically showing the structure of a fuel cell system according to a first embodiment of the present invention.

As shown in FIG. 1, a fuel cell system 10 according to an embodiment of the present invention is used as a fuel cell system and is mounted in a fuel cell vehicle such as a fuel cell based electric vehicle.

The fuel cell system 10 includes a fuel cell 14 formed by stacking a plurality of power generation cells 12. The fuel cell 14 includes a membrane electrode assembly (MEA) 16, and a cathode side separator 18 and an anode side separator 20 sandwiching the membrane electrode assembly 16 therebetween. The membrane electrode assembly 16 includes a cathode 24, an anode 26, and a solid polymer electrolyte membrane 22 interposed between the cathode 24 and the anode 26. The solid polymer electrolyte membrane is formed by impregnating a thin membrane of perfluorosulfonic acid with water, for example.

Each of the cathode 24 and the anode 26 includes a gas diffusion layer such as carbon paper, and an electrode catalyst layer of platinum alloy supported on porous carbon particles. The carbon particles are deposited uniformly on the surface of the gas diffusion layer. The electrode catalyst layer of the cathode 24 and the electrode catalyst layer of the anode 26 are formed on both surfaces of the solid polymer electrolyte membrane 22, respectively.

The cathode side separator 18 has an oxygen-containing gas flow field 28 on a surface thereof facing toward the membrane electrode assembly 16. The anode side separator 20 has a fuel gas flow field 30 on a surface thereof facing toward the membrane electrode assembly 16. A coolant flow field (not shown) is formed between the cathode side separator 18 and the anode side separator 20. The cathode side separator 18 and the anode side separator 20 are disposed adjacent to each other.

An oxygen-containing gas supply apparatus 32 is connected to the fuel cell 14. For example, the oxygen-containing gas supply apparatus 32 has an air pump 34, and one end of an oxygen-containing gas supply channel 36 is connected to the air pump 34. The other end of the oxygen-containing gas supply channel 36 is connected to the fuel cell 14, and more specifically, is connected to the oxygen-containing gas inlet side of the oxygen-containing gas flow field 28.

One end of an oxygen-containing gas discharge channel 38 is connected to the fuel cell 14, and more specifically, is connected to the oxygen-containing gas outlet side of the oxygen-containing gas flow field 28. A back pressure valve 40 is connected to the other end of the oxygen-containing gas discharge channel 38.

A branch supply channel 42 is branched from the oxygen-containing gas supply channel 36. The branch supply channel 42 has an opening 44 therein, which opens toward the fuel cell 14. The flow rate of the oxygen-containing gas that flows through the branch supply channel 42 is small in comparison with the flow rate of the oxygen-containing gas that flows through the oxygen-containing gas supply channel 36. An opening/closing valve 46 is provided in the branch supply channel 42. The opening/closing valve is capable of adjusting the flow rate of the oxygen-containing gas supplied to the branch supply channel 42.

A humidifier 48 is provided along both the oxygen-containing gas supply channel 36 and the oxygen-containing gas discharge channel 38. Although not shown, the humidifier 48 comprises a hollow fiber membrane bundle formed by bundling a plurality of porous hollow fiber membranes each of which is permeable to water. Fresh air (oxygen-containing gas) in the oxygen-containing gas supply channel 36, and an oxygen-containing off gas in the oxygen-containing gas discharge channel 38 flow respectively along the inside and the outside of each of the hollow fiber membranes. The oxygen-containing off gas consists of an oxygen-containing gas that has been consumed in the oxygen-containing gas flow field 28, and contains water therein produced during the power generation reaction. Thus, the fresh air is humidified. The humidifier 48 may alternatively be configured to allow the fresh air and the oxygen-containing off gas to flow along respective opposite surfaces of a porous membrane or an ion exchange membrane to thereby humidify the fresh air.

An oxygen-containing off gas circulation channel 50 is connected to the oxygen-containing gas supply channel 36 and to the oxygen-containing gas discharge channel 38. The oxygen-containing off gas circulation channel 50 is connected to the oxygen-containing gas supply channel 36 at a position upstream from the branch supply channel 42. According to the first embodiment, the oxygen-containing off gas circulation channel 50 is connected to the oxygen-containing gas supply channel 36 at a position upstream from the air pump 34, whereby the oxygen-containing off gas, which is discharged from the oxygen-containing gas discharge channel 38, is returned to the oxygen-containing gas supply channel 36 at a position upstream from the air pump 34. A flow rate control valve 52 is provided in the oxygen-containing off gas circulation channel 50. When the opening/closing valve 46 is closed, the flow rate at the flow rate control valve 52 is zero. Alternatively, the oxygen-containing off gas may flow continuously at a small rate through the flow rate control valve 52 at all times.

The fuel cell 14 is provided in a fuel cell chamber 54. The fuel cell chamber 54 may be formed in a fuel cell box 56, for example. The fuel cell 14, the branch supply channel 42, and a hydrogen detection sensor for detecting hydrogen concentration are placed in the fuel cell box 56. The hydrogen detection sensor 58 is provided in the fuel cell box 56 at an upper position with respect to the direction of gravity. A discharge port 60 is formed in the fuel cell box 56 at an upper position, on a wall surface opposite from the branch supply channel 42. The branch supply channel 42 is provided below the discharge port 60 in the direction of gravity.

The fuel cell system 10 includes a control device 62. When the predetermined amount of hydrogen concentration is detected by the hydrogen detection sensor 58, the opening/closing valve 46 is opened, and the opening angle of the flow rate control valve 52 is adjusted to supply humidified oxygen-containing off gas from the air pump 34 into the fuel cell chamber 54.

Operations of the fuel cell system 10 will be described below.

Figure 2:
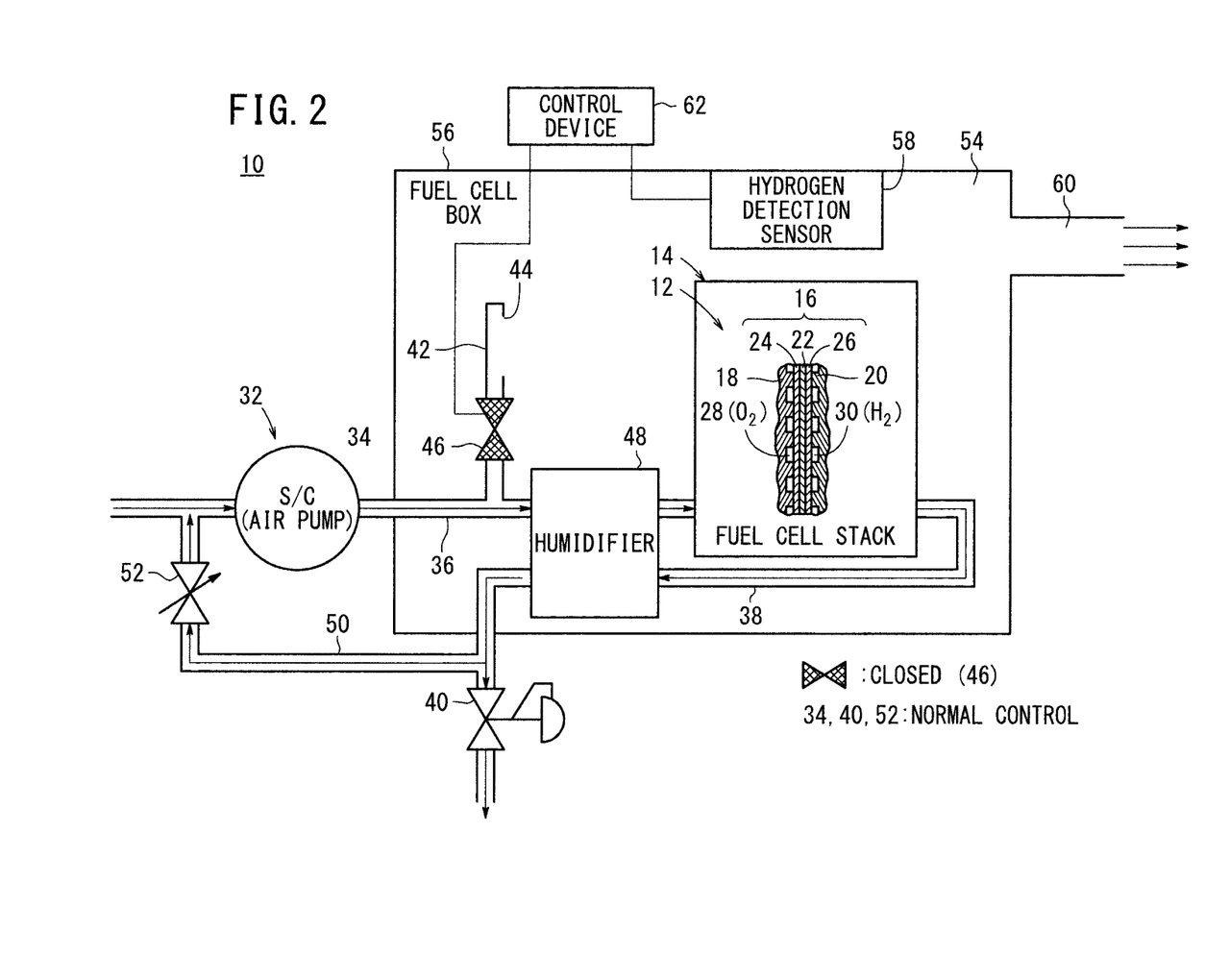
FIG. 2 is a diagram showing operations of the fuel cell system.

First, as shown in FIG. 2, during a normal traveling condition of a fuel cell based electric vehicle (not shown), which is equipped with the fuel cell system 10, the opening/closing valve 46 is closed. The air pump 34, the back pressure valve 40, and the flow rate control valve 52 are controlled normally based on a requested load from a vehicle traction motor (not shown).

In this structure, in the oxygen-containing gas supply apparatus 32, the air pump 34 is operated to supply oxygen-containing gas (air) from the oxygen-containing gas supply channel 36 to the oxygen-containing gas flow field 28 of the fuel cell 14. Meanwhile, in the fuel gas supply apparatus (not shown), fuel gas (hydrogen) is supplied from a high pressure hydrogen tank or the like to the fuel gas flow field 30 of the fuel cell 14.

Thus, in each of the power generation cells 12, oxygen contained within the oxygen-containing gas supplied to the cathode 24, and hydrogen contained within the fuel gas supplied to the anode 26 are consumed in electrochemical reactions for thereby generating electrical energy. Thus, electrical energy is supplied from the fuel cell 14 to the traction motor for enabling the vehicle to travel.

The oxygen-containing off gas, which is discharged from the fuel cell 14, is supplied from the oxygen-containing gas discharge channel 38 to the humidifier 48. In the humidifier 48, fresh air that flows in through the oxygen-containing gas supply channel 36 is humidified and heated by the oxygen-containing off gas, which flows through the oxygen-containing gas discharge channel 38. A portion of the oxygen-containing off gas that flows through the oxygen-containing gas discharge channel 38 is supplied to the oxygen-containing off gas circulation channel 50, whereupon the oxygen-containing off gas flows into the oxygen-containing gas supply channel 36 on the inlet side of the air pump 34.

Meanwhile, after the fuel gas has been discharged from the fuel cell 14, the fuel gas is mixed with fresh fuel gas. Once again, the circulating mixed fuel gas is supplied to the fuel cell 14.

Using the hydrogen detection sensor 58, the control device 62 detects the hydrogen concentration at the fuel cell chamber 54 in the fuel cell box 56.

In this regard, according to the first embodiment, when it is detected that the hydrogen concentration reaches a predetermined value or greater, the opening/closing valve 46 is opened as shown in FIG. 1. The predetermined value implies a desired value (concentration) at which the influence of hydrogen can be avoided. Further, in this state, the back pressure valve 40, the flow rate control valve 52, and the air pump 34 are controlled such that the opening angle of the back pressure valve 40 becomes lower than the opening angle of the back pressure valve 40 in the normal state, and the opening angle of the flow rate control valve 52 becomes higher than the opening angle of the flow rate control valve 52 in the normal state. Further, the flow rate at the air pump 34 becomes higher than the flow rate at the air pump 34 in the normal state.

Therefore, after the oxygen-containing off gas has flowed through the humidifier 48, in comparison with the normal state, a larger amount of oxygen-containing off gas is supplied into the oxygen-containing gas supply channel 36 through the oxygen-containing off gas circulation channel 50. When the oxygen-containing gas is discharged from the fuel cell 14, since the oxygen-containing off gas contains a large amount of water therein, it is preferable to adjust the humidity of the oxygen-containing off gas by allowing the oxygen-containing gas to flow through the humidifier 48.

The oxygen-containing off gas, which has been adjusted in humidity, is sucked in by the air pump 34 and flows from the oxygen-containing gas supply channel 36 into the branch supply channel 42. Then, the humidity-adjusted oxygen-containing off gas is ejected from the opening 44 into the fuel cell chamber 54. Thus, due to the oxygen-containing gas, hydrogen that has entered into the fuel cell chamber 54 is discharged from the discharge port 60 to the outside of the fuel cell chamber 54, whereby the fuel cell box 56 is ventilated.

At this time, the humidified oxygen-containing off gas is supplied to the fuel cell chamber 54. Therefore, it is possible to reliably prevent the humidity in the atmosphere in the fuel cell chamber 54 from being lowered significantly. Thus, the fuel cell chamber 54 can be ventilated with a simple structure, and generation of static electricity in the fuel cell chamber 54 can be suppressed as much as possible.

Figure 3:
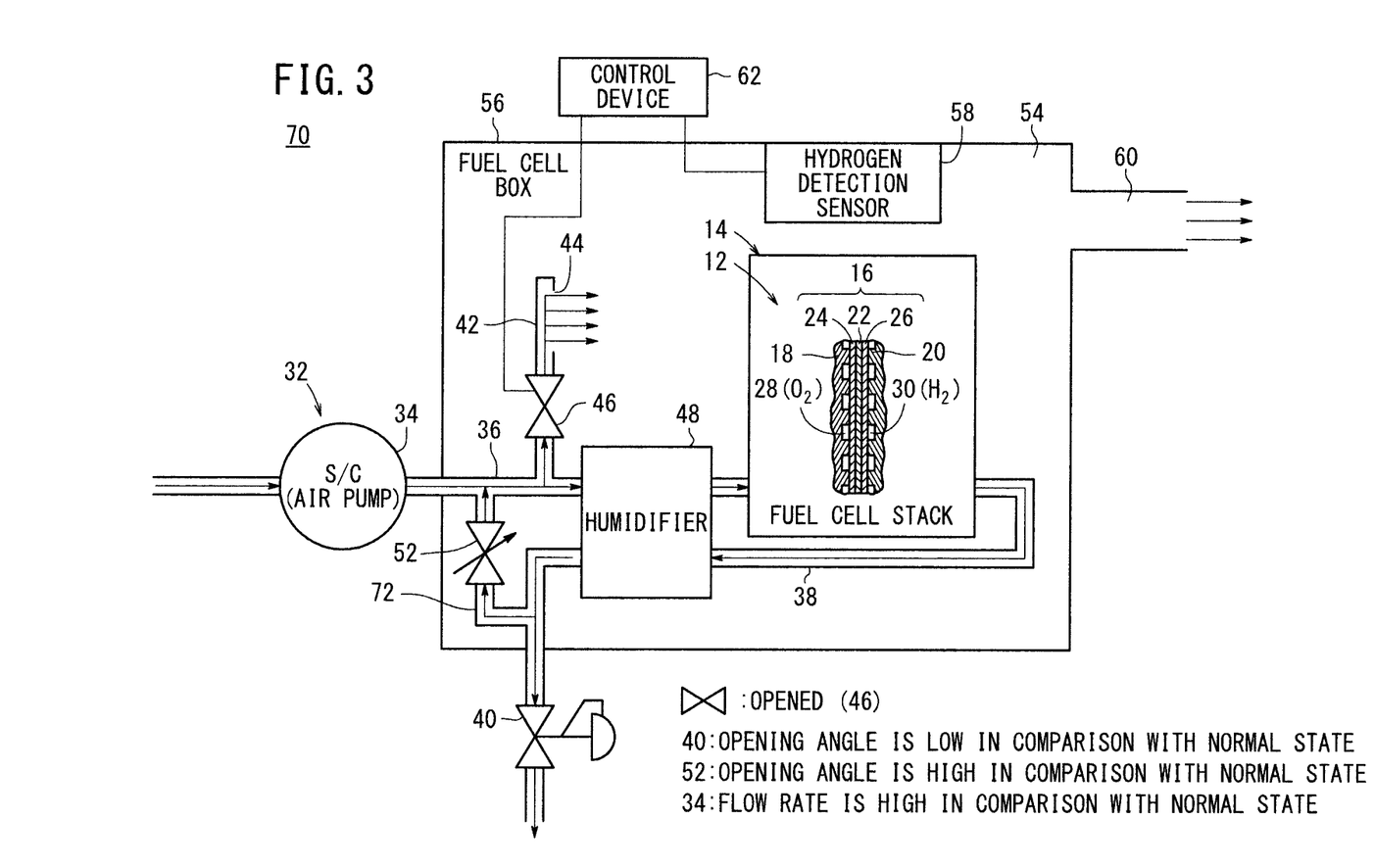
FIG. 3 is a diagram schematically showing the structure of a fuel cell system according to a second embodiment of the present invention.

FIG. 3 is a diagram schematically showing a fuel cell system 70 according to a second embodiment of the present invention. Constituent elements thereof, which are identical to those of the fuel cell system 10 according to the first embodiment, are labeled with the same reference numerals and detailed descriptions of such features will be omitted. Also, in the third and fourth embodiments to be described later, constituent elements thereof, which are identical to those of the fuel cell system 10 according to the first embodiment, are labeled with the same reference numerals and detailed descriptions of such features will be omitted.

The fuel cell system 70 includes an oxygen-containing off gas circulation channel 72. One end (inlet side) of the oxygen-containing off gas circulation channel is connected to the oxygen-containing gas discharge channel 38 at a position between the humidifier 48 and the back pressure valve 40. The other end (outlet side) of the oxygen-containing off gas circulation channel 72 is connected to the oxygen-containing gas supply channel 36 at a position between the air pump 34 and the branch supply channel 42. The flow rate control valve 52 is provided in the oxygen-containing off gas circulation channel 72.

According to the second embodiment, the oxygen-containing off gas discharged from the fuel cell 14 is supplied from the oxygen-containing gas discharge channel to the humidifier 48. Then, a portion of the oxygen-containing off gas is supplied to the oxygen-containing off gas circulation channel 72. The oxygen-containing off gas flows into the oxygen-containing gas supply channel 36 at a position downstream from the air pump 34 and flows into the branch supply channel 42. The oxygen-containing gas is ejected from the opening 44 into the fuel cell chamber 54.

Thus, with a simple structure, the same advantages as those of the first embodiment are obtained. For example, the fuel cell chamber 54 is ventilated, and generation of static electricity in the fuel cell chamber 54 can be suppressed as much as possible.

Figure 4:
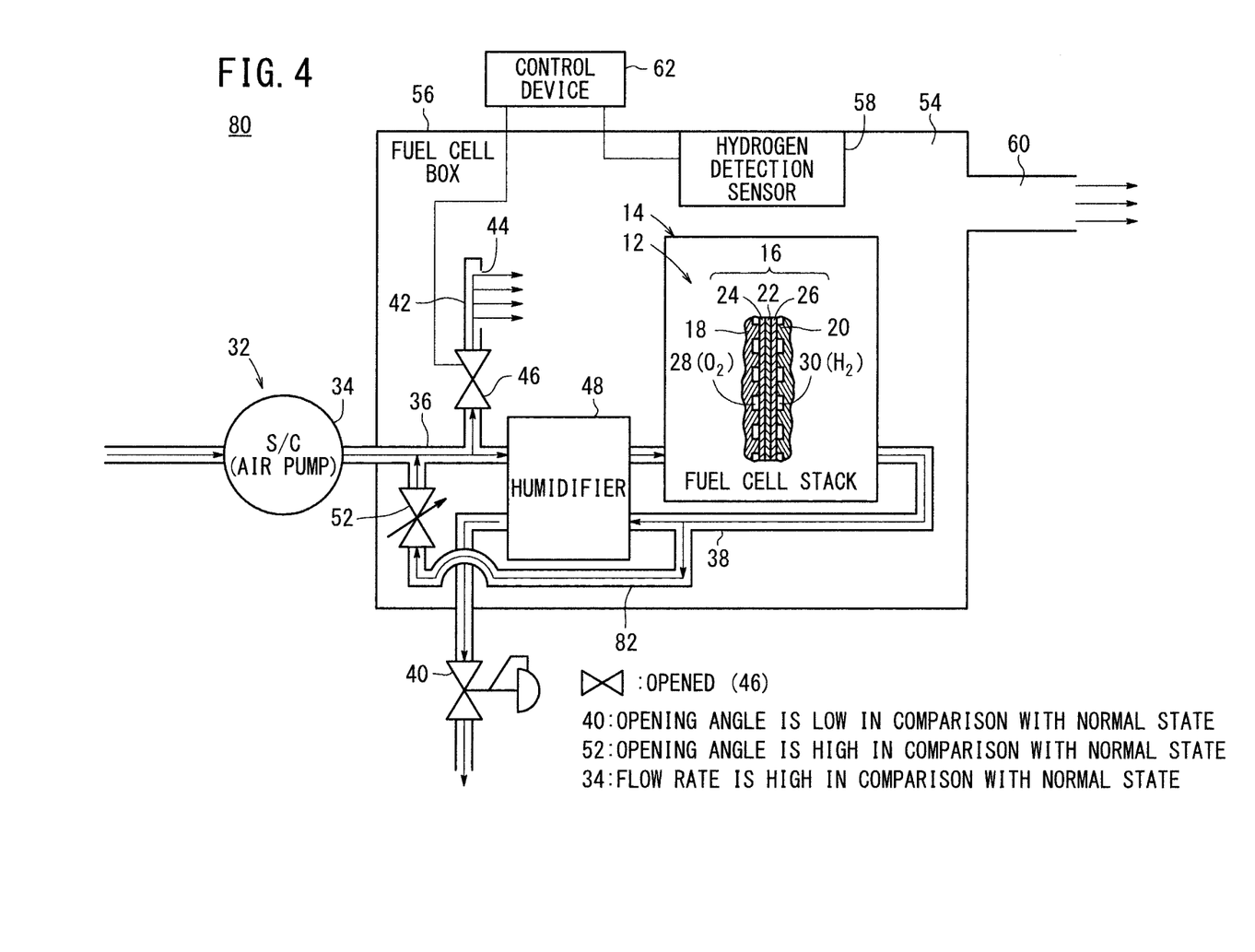
FIG. 4 is a diagram schematically showing the structure of a fuel cell system according to a third embodiment of the present invention.

FIG. 4 is a diagram schematically showing the structure of a fuel cell system 80 according to a third embodiment of the present invention.

The fuel cell system 80 includes an oxygen-containing off gas circulation channel 82. One end (inlet side) of the oxygen-containing off gas circulation channel is connected to the oxygen-containing gas discharge channel 38 at a position upstream from the humidifier 48. The other end (outlet side)

of the oxygen-containing off gas circulation channel 82 is connected to the oxygen-containing gas supply channel 36 at a position located between the air pump 34 and the branch supply channel 42. The flow rate control valve 52 is provided in the oxygen-containing off gas circulation channel 82.

According to the third embodiment, a portion of the oxygen-containing off gas discharged from the fuel cell is supplied from the oxygen-containing gas discharge channel 38 to the oxygen-containing off gas circulation channel 82 while bypassing the humidifier 48. The oxygen-containing off gas flows into the oxygen-containing gas supply channel 36 at a position downstream from the air pump 34, whereupon the oxygen-containing off gas flows into the branch supply channel 42. Thereafter, the oxygen-containing gas is ejected from the opening 44 into the fuel cell chamber 54.

Thus, with a simple structure, the same advantages as those of the first and second embodiments are obtained. For example, the fuel cell chamber 54 is ventilated, and generation of static electricity in the fuel cell chamber 54 can be suppressed as much as possible. In particular, since the oxygen-containing off gas circulation channel 82 is branched from the oxygen-containing gas discharge channel 38 at a position upstream from the humidifier 48, an oxygen-containing off gas which is higher in humidity can be supplied.

Figure 5:
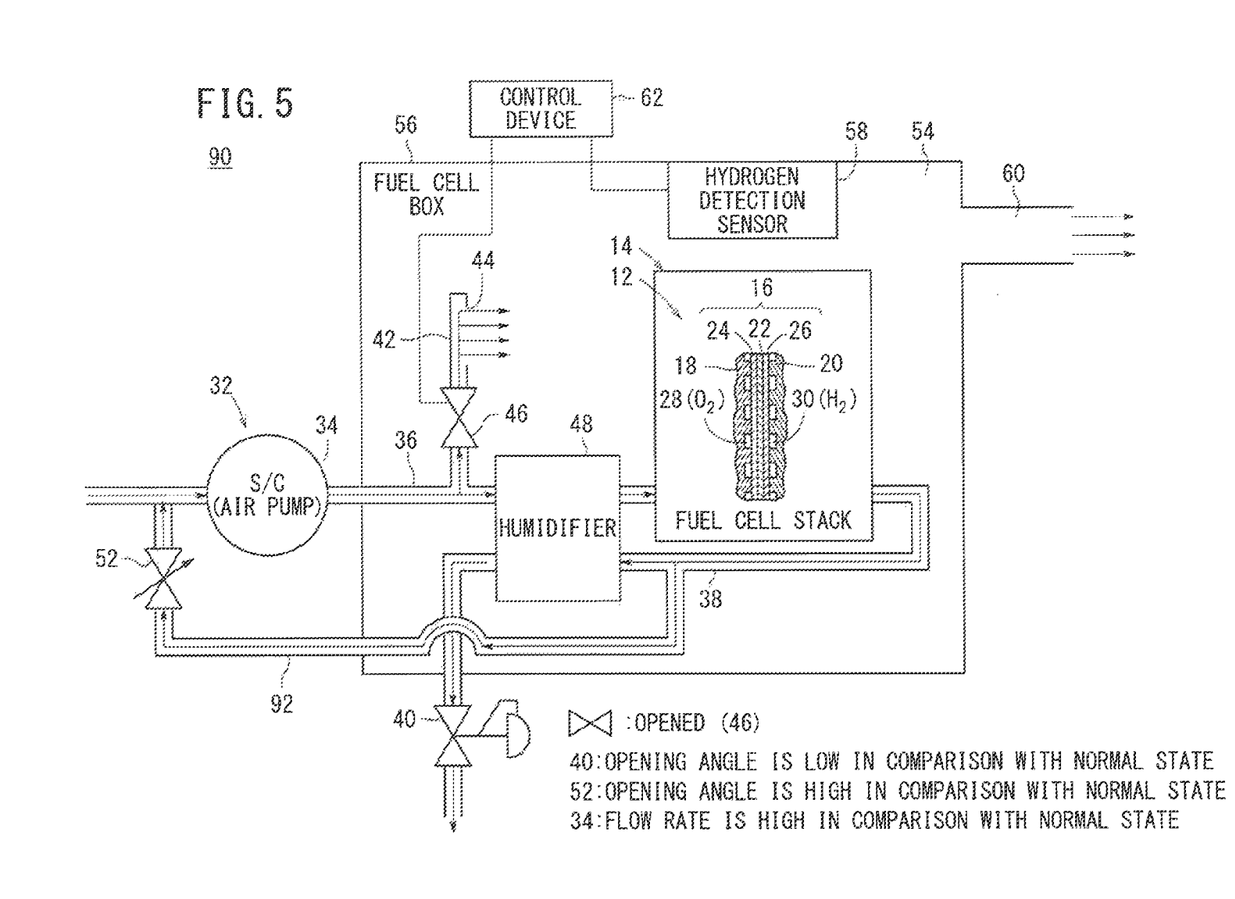
FIG. 5 is a diagram schematically showing the structure of a fuel cell system according to a fourth embodiment of the present invention.

FIG. 5 is a diagram schematically showing a fuel cell system 90 according to a fourth embodiment of the present invention.

The fuel cell system 90 includes an oxygen-containing off gas circulation channel 92. One end (inlet side) of the oxygen-containing off gas circulation channel is connected to the oxygen-containing gas discharge channel 38 at a position upstream from the humidifier 48. The other end (outlet side) of the oxygen-containing off gas circulation channel 92 is connected to the oxygen-containing gas supply channel 36 at a position upstream from the air pump 34. The flow rate control valve 52 is provided in the oxygen-containing off gas circulation channel 92.

According to the fourth embodiment, a portion of the oxygen-containing off gas discharged from the fuel cell is supplied from the oxygen-containing gas discharge channel 38 to the oxygen-containing off gas circulation channel 92 while bypassing the humidifier 48. The oxygen-containing gas flows into the oxygen-containing gas supply channel 36 at a position upstream from the air pump 34. Through operation of the air pump 34, the oxygen-containing gas flows into the branch supply channel 42, whereupon the oxygen-containing gas is ejected from the opening 44 into the fuel cell chamber 54.

Thus, with a simple structure, the same advantages as those of the first through third embodiments are obtained. For example, the fuel cell chamber 54 is ventilated, and generation of static electricity in the fuel cell chamber 54 can be suppressed as much as possible.

While the invention has been particularly shown and described with reference to preferred embodiments, it will be understood that variations and modifications can be effected to the embodiments by those skilled in the art without departing from the spirit of the invention as defined by the appended claims.

What is claimed is:

1. A fuel cell system comprising:
 a fuel cell; and
 a single humidifier,
 wherein the fuel cell comprises a power generation cell, the power generation cell having a membrane electrode assembly, the membrane electrode assembly including a cathode, an anode, and an electrolyte membrane interposed between the cathode and the anode, the fuel cell performing power generation by causing electrochemical reactions between an oxygen-containing gas supplied to the cathode and a fuel gas supplied to the anode, the fuel cell system further comprising an oxygen-containing gas supply apparatus for supplying the oxygen-containing gas to the fuel cell,
 the oxygen-containing gas supply apparatus comprising:
 an oxygen-containing gas supply channel connected to an oxygen-containing gas inlet of the fuel cell for allowing the oxygen-containing gas supplied from a fluid pressure device to flow into the oxygen-containing gas inlet;
 a branch supply channel branched from the oxygen-containing gas supply channel, the branch supply channel being opened to the inside of a fuel cell chamber containing the fuel cell;
 an oxygen-containing gas discharge channel for discharging the oxygen-containing gas from the fuel cell as an oxygen-containing off gas; and
 an oxygen-containing off gas circulation channel one end of which is connected to the oxygen-containing gas discharge channel and the other end of which is connected to the oxygen-containing gas supply channel at a position upstream from the branch supply channel,
 wherein the oxygen-containing off gas circulation channel is configured to return the oxygen-containing gas discharged from the oxygen-containing gas discharge channel to the oxygen-containing gas supply channel at a position upstream from the branch supply channel,
 wherein the humidifier is disposed along both the oxygen-containing gas supply channel and the oxygen-containing gas discharge channel,
 wherein the oxygen-containing off gas circulation channel is connected at a position on the oxygen-containing gas supply channel upstream from the humidifier, and upstream or downstream from the fluid pressure device, and
 wherein the humidifier is disposed downstream of the branch supply channel.

2. The fuel cell system according to claim 1, further comprising:
 an opening/closing valve provided in the branch supply channel;
 a flow rate control valve provided in the oxygen-containing off gas circulation channel;
 a hydrogen concentration detection sensor for detecting a hydrogen concentration in the fuel cell chamber; and
 a control device configured to open the opening/closing valve and to adjust the opening angle of the flow rate control valve when the hydrogen concentration detection sensor detects that the hydrogen concentration has reached or exceeded a predetermined value, for thereby supplying the oxygen-containing off gas, which contains water therein, from the fluid pressure device into the fuel cell chamber.

3. The fuel cell system according to claim 1, wherein the oxygen-containing off gas circulation channel is configured to return the oxygen-containing off gas discharged into the oxygen-containing gas discharge channel to the oxygen-containing gas supply channel at a position upstream from the fluid pressure device.

4. The fuel cell system according to claim 1, wherein the oxygen-containing off gas circulation channel is configured to return the oxygen-containing off gas discharged into the oxygen-containing gas discharge channel to the oxygen-containing gas supply channel at a position downstream from the fluid pressure device.

5. The fuel cell system according to claim 1,
wherein the humidifier is configured to humidify the oxygen-containing gas flowing through the oxygen-containing gas supply channel as a result of the oxygen-containing off gas flowing through the oxygen-containing gas discharge channel,
wherein the oxygen-containing off gas contains water therein produced during a power generation reaction, and
wherein after the oxygen-containing off gas has passed through the humidifier, the oxygen-containing off gas is supplied to the oxygen-containing off gas circulation channel.

6. The fuel cell system according to claim 1,
wherein the humidifier humidifies the oxygen-containing gas that flows through the oxygen-containing gas supply channel as a result of the oxygen-containing off gas flowing through the oxygen-containing gas discharge channel; and
before the oxygen-containing off gas is supplied to the humidifier, a portion of the oxygen-containing off gas is supplied to the oxygen-containing off gas circulation channel while bypassing the humidifier.

\* \* \* \* \*